US012756455B2

(12) United States Patent
Miao et al.

(10) Patent No.: US 12,756,455 B2
(45) Date of Patent: Oct. 6, 2026

(54) TRANSMISSION SIGNAL COMPENSATION METHOD, NETWORK SIDE DEVICE AND TERMINAL

(71) Applicant: DATANG MOBILE COMMUNICATIONS EQUIPMENT CO., LTD., Beijing (CN)

(72) Inventors: Deshan Miao, Beijing (CN); Shaohui Sun, Beijing (CN); Shaoli Kang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 594 days.

(21) Appl. No.: 17/999,626

(22) PCT Filed: Jun. 4, 2021

(86) PCT No.: PCT/CN2021/098316
§ 371 (c)(1),
(2) Date: Nov. 22, 2022

(87) PCT Pub. No.: WO2021/254176
PCT Pub. Date: Dec. 23, 2021

(65) Prior Publication Data

US 2023/0208507 A1 Jun. 29, 2023

(30) Foreign Application Priority Data

Jun. 18, 2020 (CN) ......................... 202010561251.2

(51) Int. Cl.
*H04B 7/185* (2006.01)
*H04B 7/0413* (2017.01)
*H04W 72/23* (2023.01)

(52) U.S. Cl.
CPC ..... *H04B 7/18513* (2013.01); *H04B 7/18519* (2013.01); *H04W 72/23* (2023.01); *H04B 7/0413* (2013.01)

(58) Field of Classification Search
CPC ............ H04B 7/18513; H04B 7/18519; H04B 7/0413; H04B 7/024; H04B 7/0671; H04W 72/23; H04W 56/0035; H04W 56/0045
See application file for complete search history.

(56) References Cited

U.S. PATENT DOCUMENTS

2014/0241181 A1 8/2014 Barrass et al.
2018/0323863 A1* 11/2018 Bournes ............... H04B 10/118
(Continued)

FOREIGN PATENT DOCUMENTS

CN 104581926 A 4/2015
CN 107528628 A 12/2017
(Continued)

OTHER PUBLICATIONS

European Search Report issued Nov. 20, 2023 in European Application No. 21825639.4.
(Continued)

*Primary Examiner* — Diane D Mizrahi
(74) *Attorney, Agent, or Firm* — Harness, Dickey & Pierce, P.L.C.

(57) ABSTRACT

Embodiments of the present disclosure provide a transmission signal compensation method, a network side device and a terminal. The method includes: obtaining, by a network side device, a reference compensation parameter of a reference transmission link of a terminal; determining, by the network side device, a first compensation parameter of a first transmission link according to the reference compensation parameter, wherein the first transmission link is a transmis-
(Continued)

sion link between the terminal and a first satellite; performing, by the network side device, sending or receiving compensation on a transmission signal of the first transmission link according to the first compensation parameter.

9 Claims, 7 Drawing Sheets

(56) References Cited

U.S. PATENT DOCUMENTS

| | | | |
|---|---|---|---|
| 2020/0092017 | A1 | 3/2020 | Song |
| 2020/0153500 | A1 | 5/2020 | Kim et al. |
| 2022/0295434 | A1 | 9/2022 | Wang et al. |
| 2022/0360320 | A1 | 11/2022 | Miao et al. |

FOREIGN PATENT DOCUMENTS

| | | | |
|---|---|---|---|
| CN | 110545136 | A | 12/2019 |
| CN | 110545247 | A | 12/2019 |
| CN | 110798422 | A | 2/2020 |
| CN | 111262615 | A | 6/2020 |
| CN | 111800852 | A | 10/2020 |
| CN | 112039579 | A | 12/2020 |
| CN | 112887004 | A | 6/2021 |
| WO | WO-2020/089471 | A1 | 5/2020 |
| WO | WO-2020/259454 | A1 | 12/2020 |

OTHER PUBLICATIONS

Panasonic, “Timing advance and RACH aspect for NTN,” 3GPP TSG RAN WG1#98, R1-1908818, Aug. 26, 2019.

CATT, “PRACH design and UL timing advance,” 3GPP TSG RAN WG1 Meeting #97, R1-1906325, May 13, 2019.

First Office Action issued Apr. 7, 2022 in Chinese Application No. 202010561251.2.

International Search Report/Written Opinion issued Aug. 30, 2021 in International Application No. PCT/CN2021/098316.

Thales, “On Doppler shift compensation and Timing Advance in NTN,” 3GPP TSG RAN WG1 Meeting #97, R1-1907390, May 13, 2019.

* cited by examiner

TRANSMISSION SIGNAL COMPENSATION METHOD, NETWORK SIDE DEVICE AND TERMINAL

CROSS-REFERENCE TO RELATED APPLICATIONS

This application is the U.S. national phase of PCT Application No. PCT/CN2021/098316 filed on Jun. 4, 2021, which claims priorities of the Chinese patent application No. 202010561251.2 filed on Jun. 18, 2020, which are incorporated herein by reference in their entireties.

TECHNICAL FIELD

The present disclosure relates to the field of communications technology, in particular to a transmission signal compensation method, a network side device, and a terminal.

BACKGROUND

At present, a plurality of-input a plurality of-output (MIMO) transmission technology or cooperative transmission technology is only applicable to fixed transmission points, for example, MIMO or cooperative transmission is implemented between a terminal and a plurality of base stations. However, with the development of communication technology, in satellite communication, a plurality of satellites can also provide data services for a terminal to effectively increase the capacity of data transmission, but the distances between different satellites and the terminal are different, so that when a plurality of satellites or satellite-ground (for example, the satellite and the base station in ground provide data services for a same terminal) perform coordinated multi-point transmission, the transmission effect of the transmission signal is relatively poor.

SUMMARY

Embodiments of the present disclosure provide a transmission signal compensation method, includes: obtaining, by a network side device, a reference compensation parameter of a reference transmission link of a terminal; determining, by the network side device, a first compensation parameter of a first transmission link according to the reference compensation parameter, wherein the first transmission link is a transmission link between the terminal and a first satellite; performing, by the network side device, sending or receiving compensation on a transmission signal of the first transmission link according to the first compensation parameter.

Optionally, the determining, by the network side device, a first compensation parameter of a first transmission link according to the reference compensation parameter includes: determining, by the network side device, the first compensation parameter of the first transmission link according to the reference compensation parameter and a link parameter, wherein the link parameter is used to indicate a link parameter difference between the first transmission link and the reference transmission link.

Optionally, the reference compensation parameter or the first compensation parameter includes at least one of the following: a timing compensation parameter; or a frequency compensation parameter.

Optionally, the method further includes: sending, by the network side device, the first compensation parameter to the terminal.

Optionally, the reference transmission link is a transmission link between the terminal and a second satellite; or the reference transmission link is a transmission link between the terminal and a ground base station.

Optionally, the obtaining, by the network side device, the reference compensation parameter of the reference transmission link includes: receiving, by the network side device, the reference compensation parameter of the reference transmission link sent by other network side devices; or calculating, by the network side device, the reference compensation parameter of the reference transmission link according to ephemeris information of a satellite of the reference transmission link.

Optionally, the reference compensation parameter of the reference transmission link includes at least one of the following: a common timing compensation parameter of a cell or a satellite beam corresponding to the reference transmission link; a common frequency compensation parameter of the cell or the satellite beam corresponding to the reference transmission link; a terminal-specific timing compensation parameter corresponding to the reference transmission link; a terminal-specific frequency compensation parameter corresponding to the reference transmission link.

Optionally, all or part of compensation of the transmission signal of the first transmission link or the reference transmission link is performed by the network side device; the all compensation includes all sending compensation or all receiving compensation; the part of compensation includes the part of sending compensation or the part of receiving compensation.

Optionally, the part of compensation of the first transmission link or the reference transmission link includes timing or frequency compensation between a reference point and a ground gateway or a satellite in the transmission link.

Optionally, the performing, by the network side device, the sending compensation on the transmission signal of the first transmission link according to the first compensation parameter includes: performing, by the network side device, reference compensation and additional compensation on a downlink transmission signal of the first transmission link according to the first compensation parameter; wherein the reference compensation is a sending compensation corresponding to the reference compensation parameter, and the additional compensation is an additional sending compensation performed on the basis of the reference compensation.

Optionally, the method further comprises at least one of the following: sending, by the network side device, indication information of the reference transmission link to the terminal; sending, by the network side device, a receiving compensation mode notification of a downlink signal to the terminal; sending, by the network side device, a sending compensation mode notification of an uplink signal to the terminal.

An embodiment of the present disclosure provides a transmission signal compensation method, includes: obtaining, by a terminal, a first compensation parameter of a first transmission link, wherein the first transmission link is a transmission link between the terminal and a satellite; performing, by the terminal, sending or receiving compensation on a transmission signal of the first transmission link according to the first compensation parameter.

Optionally, the first compensation parameter comprises at least one of the following: a timing compensation parameter and a frequency compensation parameter.

Optionally, the obtaining, by the terminal, the first compensation parameter of the first transmission link includes: obtaining, by the terminal, a reference compensation parameter of a reference transmission link of the terminal, and determining the first compensation parameter of the first transmission link according to the reference compensation parameter; or receiving, by the terminal, the first compensation parameter of the first transmission link sent by a network side device.

Optionally, the determining, by the terminal, the first compensation parameter of the first transmission link according to the reference compensation parameter includes: determining, by the terminal, the first compensation parameter of the first transmission link according to the reference compensation parameter and a link parameter, wherein the link parameter is used to indicate a link parameter difference between the first transmission link and the reference transmission link.

Optionally, the reference transmission link is a transmission link between the terminal and a second satellite; or the reference transmission link is a transmission link between the terminal and a ground base station.

Optionally, the obtaining, by the terminal, the reference compensation parameter of the reference transmission link of the terminal includes: receiving, by the terminal, the reference compensation parameter of the reference transmission link sent by the network side device; or calculating, by the terminal, the reference compensation parameter of the reference transmission link according to ephemeris information of a satellite of the reference transmission link.

Optionally, the reference compensation parameter of the reference transmission link includes at least one of the following: a common timing compensation parameter of a cell or a satellite beam corresponding to the reference transmission link; a common frequency compensation parameter of the cell or the satellite beam corresponding to the reference transmission link; a terminal-specific timing compensation parameter corresponding to the reference transmission link; a terminal-specific frequency compensation parameter corresponding to the reference transmission link.

Optionally, all or part of compensation of the transmission signal of the first transmission link or the reference transmission link is performed by the terminal; the all compensation includes all sending compensation or all receiving compensation; the part of compensation includes the part of sending compensation or the part of receiving compensation.

Optionally, the part of compensation of the first transmission link or the reference transmission link includes timing or frequency compensation between the terminal and a reference point in the transmission link.

Optionally, during uplink transmission, a compensation parameter of each transmission link is calculated based on respective link parameter information, and performing, by the terminal, the sending compensation on the transmission signal of the first transmission link according to the first compensation parameter, includes: performing, by the terminal, full or part of sending compensation on the uplink transmission signal of the first transmission link independently according to the first compensation parameter; or the first compensation parameter is a compensation parameter calculated based on the reference compensation parameter of the reference transmission link of the terminal, and performing, by the terminal, the sending compensation on the transmission signal of the first transmission link according to the first compensation parameter, includes: performing, by the terminal, all or part of sending compensation in the reference compensation and the additional compensation on the uplink transmission signal of the first transmission link according to the first compensation parameter, wherein the reference compensation is sending compensation corresponding to the reference compensation parameter, the additional compensation is additional sending compensation performed on the basis of the reference compensation; or adopting, by the terminal, a same sending side compensation when transmitting an uplink signal in each transmission link.

Optionally, the method further includes receiving, by the terminal, indication information of the reference transmission link sent by the network side device.

Optionally, the method further comprises at least one of the following: receiving, by the terminal, a receiving compensation mode notification of a sending downlink signal sent by the network side device; receiving, by the terminal, a sending compensation mode notification of a sending uplink signal sent by the network side device.

An embodiment of the present disclosure provides a network side device, includes: an obtaining module, configured to obtain a reference compensation parameter of a reference transmission link of a terminal; a determination module, configured to determine a first compensation parameter of a first transmission link according to the reference compensation parameter, wherein the first transmission link is a transmission link between the terminal and a first satellite; a compensation module, configured to perform sending or receiving compensation on a transmission signal of the first transmission link according to the first compensation parameter.

Optionally, the determining module is configured to determine the first compensation parameter of the first transmission link according to the reference compensation parameter and a link parameter, wherein the link parameter is used to indicate a link parameter difference between the first transmission link and the reference transmission link.

Optionally, the compensation module is configured to perform reference compensation and additional compensation on a downlink transmission signal of the first transmission link according to the first compensation parameter; the reference compensation is a sending compensation corresponding to the reference compensation parameter, and the additional compensation is an additional sending compensation performed on the basis of the reference compensation.

An embodiment of the present disclosure provides a terminal, includes: an obtaining module, configured to obtain a first compensation parameter of a first transmission link, wherein the first transmission link is a transmission link between the terminal and a satellite; a compensation module, configured to perform sending or receiving compensation on a transmission signal of the first transmission link according to the first compensation parameter.

Optionally, the obtaining module is configured to obtain a reference compensation parameter of a reference transmission link of the terminal, and determining the first compensation parameter of the first transmission link according to the reference compensation parameter; or the obtaining module is configured to receive the first compensation parameter of the first transmission link sent by a network side device.

Optionally, during uplink transmission, a compensation parameter of each transmission link is calculated based on respective link parameter information, and the compensation module is configured to independently perform all or part of sending compensation on the uplink transmission signal of the first transmission link according to the first compensation parameter; or the first compensation parameter is a compensation parameter calculated based on a reference compensation parameter of a reference transmission link of the terminal, and the compensation module is configured to perform all or part of sending compensation in the reference compensation and the additional compensation on the uplink transmission signal of the first transmission link according to the first compensation parameter, wherein the reference compensation is the sending compensation corresponding to the reference compensation parameter, the additional compensation is additional sending compensation performed on the basis of the reference compensation; or the terminal adopts a same sending side compensation when transmitting the uplink signal in each transmission link.

An embodiment of the present disclosure provides a network side device, includes: a transceiver, a memory, a processor, and a program stored on the memory and executed by the processor, wherein, the transceiver or the processor is configured to obtain a reference compensation parameter of a reference transmission link of a terminal; the processor is configured to determine a first compensation parameter of a first transmission link according to the reference compensation parameter, wherein the first transmission link is a transmission link between the terminal and a first satellite;

the transceiver or the processor is configured to perform sending or receiving compensation on a transmission signal of the first transmission link according to the first compensation parameter.

Optionally, the determining a first compensation parameter of a first transmission link according to the reference compensation parameter includes: determining the first compensation parameter of the first transmission link according to the reference compensation parameter and a link parameter, wherein the link parameter is used to indicate a link parameter difference between the first transmission link and the reference transmission link.

Optionally, the reference compensation parameter of the reference transmission link includes at least one of the following: a common timing compensation parameter of a cell or a satellite beam corresponding to the reference transmission link; a common frequency compensation parameter of the cell or the satellite beam corresponding to the reference transmission link; a terminal-specific timing compensation parameter corresponding to the reference transmission link; a terminal-specific frequency compensation parameter corresponding to the reference transmission link.

Optionally, the performing sending compensation for the transmission signal of the first transmission link according to the first compensation parameter includes: performing reference compensation and additional compensation on a downlink transmission signal of the first transmission link according to the first compensation parameter; wherein the reference compensation is a sending compensation corresponding to the reference compensation parameter, and the additional compensation is an additional sending compensation performed on the basis of the reference compensation.

An embodiment of the present disclosure provides a terminal includes: a transceiver, a memory, a processor, and a program stored on the memory and executed by the processor, wherein, the transceiver or the processor is configured to obtain a first compensation parameter of a first transmission link, wherein the first transmission link is a transmission link between the terminal and a satellite; the transceiver or the processor is configured to perform sending or receiving compensation on a transmission signal of the first transmission link according to the first compensation parameter.

Optionally, the obtaining the first compensation parameter of the first transmission link includes: obtaining a reference compensation parameter of a reference transmission link of the terminal, and determining the first compensation parameter of the first transmission link according to the reference compensation parameter; or receiving the first compensation parameter of the first transmission link sent by a network side device.

Optionally, the determining the first compensation parameter of the first transmission link according to the reference compensation parameter includes: determining the first compensation parameter of the first transmission link according to the reference compensation parameter and a link parameter, wherein the link parameter is used to indicate a link parameter difference between the first transmission link and the reference transmission link.

Optionally, during uplink transmission, a the compensation parameter of each transmission link is calculated based on respective link parameter information, and performing the sending compensation on the transmission signal of the first transmission link according to the first compensation parameter includes: independently performing all or part of sending compensation on the uplink transmission signal of the first transmission link according to the first compensation parameter; or the first compensation parameter is a compensation parameter calculated based on a reference compensation parameter of a reference transmission link of the terminal, and the performing sending compensation on the transmission signal of the first transmission link according to the first compensation parameter includes: performing all or part of sending compensation in the reference compensation and the additional compensation on the uplink transmission signal of the first transmission link according to the first compensation parameter, wherein the reference compensation is sending compensation corresponding to the reference compensation parameter, the additional compensation is additional sending compensation performed on the basis of the reference compensation; or adopting, by the terminal, a same sending side compensation when transmitting an uplink signal in each transmission link.

An embodiment of the present disclosure provides a computer-readable storage medium having a program stored thereon, wherein the program is executed by a processor to implement the transmission signal compensation method.

In the embodiment of the present disclosure, the network side device obtains the reference compensation parameter of the reference transmission link of the terminal; the network side device determines the first compensation parameter of the first transmission link according to the reference compensation parameter, and the first transmission link is a transmission link between the terminal and the first satellite; the network side device performs sending or receiving compensation on the transmission signal of the first transmission link according to the first compensation parameter. Since the sending or receiving compensation is performed on the transmission signal of the first transmission link according to the first compensation parameter, the transmission effect of the transmission signal can be improved.

DETAILED DESCRIPTION

In order to make the technical problems, technical solutions and advantages to be solved by the present disclosure more clear, detailed description will be given below with reference to the accompanying drawings and specific embodiments.

Figure 1:
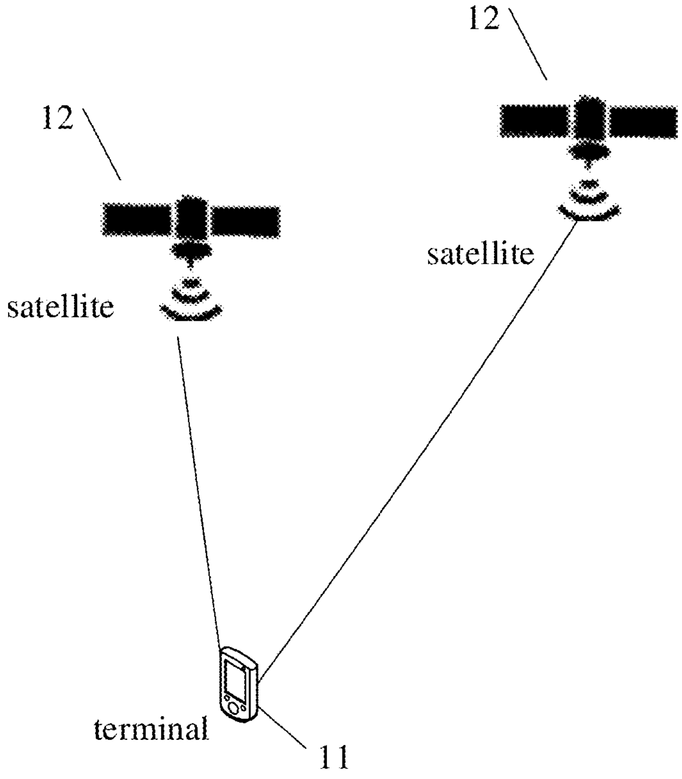
FIG. 1 is a schematic diagram of a network structure provided by an embodiment of the present disclosure.

FIG. 1 is a schematic diagram of a network structure to which the embodiments of the present disclosure can be applied. As shown in FIG. 1, the network structure includes a terminal 11 and a plurality of satellites 12, wherein the terminal 11 can directly communicate with the satellites 12, or can communicate with the satellite 12 through an ground gateway. The plurality of satellites 12 may serve the terminal 11, such as cooperative transmission performed by the plurality of satellites 12 for the terminal 11, or MIMO transmission performed by the plurality of satellites 12 for the terminal.

Figure 2:
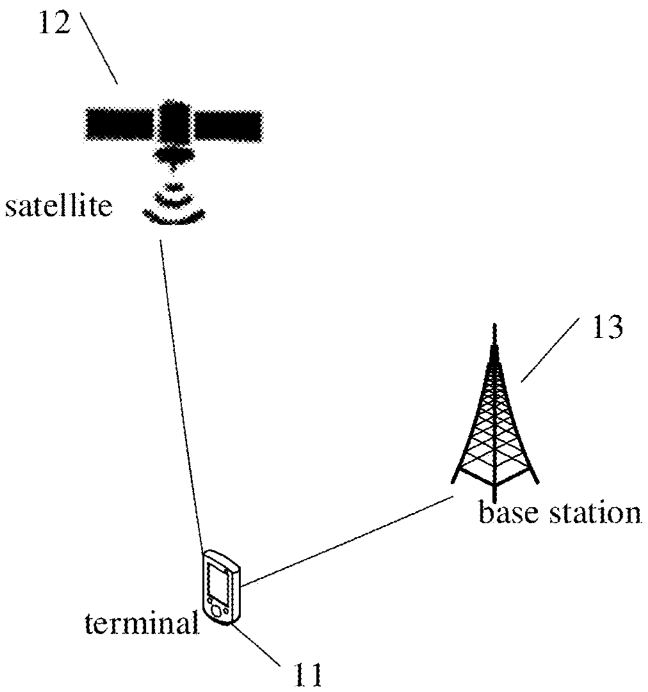
FIG. 2 is another schematic diagram of a network structure provided by an embodiment of the present disclosure.

FIG. 2 is a schematic diagram of another network structure to which the embodiments of the present disclosure can be applied. As shown in FIG. 2, the network structure includes a terminal 11, a satellite 12, and a base station 13, wherein the terminal 11 can directly communicate with the satellite 12, or communicate with the satellites 12 through an ground gateway. The satellite 12 and the base station 13 may perform services for the terminal 11, such as cooperative transmission performed by the satellite 12 and the base station 13 for the terminal 11, or MIMO transmission performed by the satellite 12 and the base station 13 for the terminal.

The terminal 11 may be a user equipment (UE) or other terminal equipment, for example: a mobile phone, a tablet computer, a laptop computer, a personal digital assistant (PDA), a Mobile Internet Device (MID), a wearable device, a robot, a vehicle and other terminal side devices. It should be noted that the embodiments of the present disclosure do not limit the specific type of the terminal. The satellite 12 may be a low-orbit satellite or a high-orbit satellite, etc. It should be noted that the specific type of the satellite is not limited in the embodiment of the present disclosure, and the satellite 12 may be a conventional satellite, an airside platform, or an unmanned aerial vehicle. The base station 13 can be a macro station, LTE eNB, 5G NR NB, etc., or the base station 13 can also be a small station, such as a low power node (LPN), pico, femto and other small stations, or the network side equipment can be an access point (AP); or the base station 13 may also be a central unit (CU) or a transmission reception point (TRP) or the like. It should be noted that, the embodiments of the present disclosure do not limit the specific type of the network side device.

In the embodiment of the present disclosure, the communication mode of the satellite includes a regeneration mode and a transparent forwarding mode. For the regeneration mode, an on-board base station device is used, and for the transparent forwarding mode, the satellite is used as a signal relay device, and the signal processing device of the network is on the ground, is also known as the ground gateway.

Figure 3:
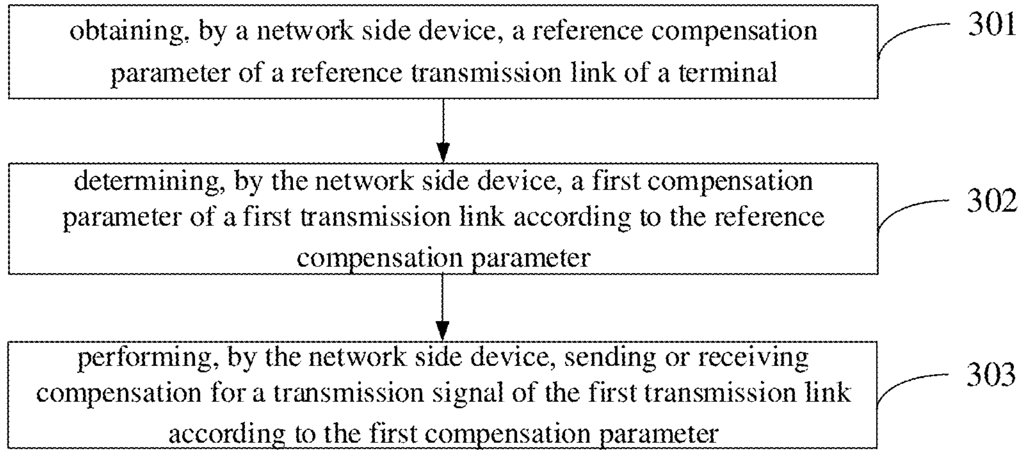
FIG. 3 is a flowchart of a transmission signal compensation method provided by an embodiment of the present disclosure.

FIG. 3 is a flowchart of a transmission signal compensation method according to an embodiment of the present disclosure. As shown in FIG. 3, the method includes:

Step 301, obtaining, by a network side device, a reference compensation parameter of a reference transmission link of a terminal;

Step 302, determining, by the network side device, a first compensation parameter of a first transmission link according to the reference compensation parameter, wherein the first transmission link is a transmission link between the terminal and a first satellite;

Step 303: performing, by the network side device, sending or receiving compensation for a transmission signal of the first transmission link according to the first compensation parameter.

Wherein, the reference transmission link of the terminal may be any one of a plurality of transmission links of the terminal, and the reference transmission link may be determined by the network side device or the terminal, for example, a link with a smallest transmission delay, or a link with a middle transmission delay, etc.

The reference compensation parameter of the reference transmission link may be used to compensate the compensation parameter of at least one of information such as transmission delay and frequency offset of the transmission signal of the terminal in the reference transmission link. Wherein, the frequency offset may be a Doppler offset.

The network side device determining the first compensation parameter of the first transmission link according to the reference compensation parameter may be to determine the first compensation parameter of the first transmission link using the reference compensation parameter as a reference. In addition, the first transmission link may be any transmission link except the reference transmission link, that is, the first satellite may be any satellite.

In the embodiment of the present disclosure, a plurality of satellites or the satellite and the ground base station form a plurality of cooperative transmission points, and each transmission point and a terminal form a transmission link. The first compensation parameter of each transmission link is determined according to the reference compensation parameter, it is possible to maintain the timing and frequency synchronization with the reference transmission link by synchronizing the timing and frequency of the plurality of transmission links and taking the reference transmission link as a reference. For example, other transmission links perform frequency and time compensation by taking the reference transmission link as a reference to maintain the synchronization of transmission signals.

The network side device performing sending or receiving compensation for the transmission signal of the first transmission link according to the first compensation parameter may be, performing receiving compensation for the uplink signal of the first transmission link, or performing sending compensation for the downlink signal. In addition, the compensation may include at least one of timing compensation and frequency compensation.

It should be noted that the network side device may be a base station, a satellite, or a gateway, or the like.

In the embodiment of the present disclosure, through the above steps, the first compensation parameter of the first transmission link is determined according to the reference compensation parameter of the reference transmission link, and then sending or receiving compensation is performed for the transmission signal of the first transmission link according to the first compensation parameter. Therefore, the transmission effect of the transmission signal can be improved, and the cooperative transmission or MIMO transmission among a plurality of satellites, or the satellite-ground cooperative transmission or MIMO transmission can be supported. Further, through the above compensation, frequency and time synchronization during transmission of a plurality of transmission links can be realized, so as to implement space division multi-stream transmission and improve the spectral efficiency of satellite communication.

As an optional implementation, the determining, by the network side device, the first compensation parameter of the first transmission link according to the reference compensation parameter, includes:

Determining, by the network side device, the first compensation parameter of the first transmission link according to the reference compensation parameter and a link parameter, wherein the link parameter is used to indicate a link parameter difference between the first transmission link and the reference transmission link.

The link parameter difference may be a distance difference, such as a distance difference relative to the terminal. Of course, this is not limited, for example, it may also be a slot offset.

In addition, the above link parameter may be pre-configured, or interacted by the network side devices, the inter-base station interface Xn can be used for information exchange between network side devices, including the exchange of link compensation parameters, or the exchange of satellite ephemeris information, terminal information, and resource scheduling information.

In this embodiment, the first compensation parameter of the first transmission link can be accurately determined through the reference compensation parameters and link parameters, and then synchronization, such as timing and frequency synchronization, between the first transmission link and the reference transmission link can be realized. For example: when the transmission distance of the first transmission link is greater than the transmission distance of the reference transmission link, the first compensation parameter adds compensation on the basis of the reference transmission parameter. If the reference compensation parameter is 5 ms, then the first compensation parameter may be 6 ms or 7 ms, which is specifically determined according to the above link parameters, so that when compensation is performed according to these compensation parameters, the transmission signals of the plurality of transmission links can reach the terminal at the same time, so as to achieve the effect of timing synchronization.

In this embodiment, when multi-satellites or satellite-ground cooperative transmission is performed for one terminal, information such as the transmission delay and Doppler shift of the plurality of transmission points for the cooperative transmission and the served terminal may be determined.

As an optional implementation, the reference compensation parameter or the first compensation parameter includes at least one of the following:

A timing compensation parameter; or

A frequency compensation parameter.

Wherein, the frequency compensation parameter may be a Doppler frequency shift compensation parameter.

In this embodiment, timing compensation and frequency compensation can be performed to achieve the effect of timing and frequency synchronization.

As an optional embodiment, the method further includes:

Sending, by the network side device, the first compensation parameter to the terminal.

Since the first compensation parameter is sent to the terminal, the workload of the terminal can be reduced, after the terminal receives the compensation parameter, the compensation parameter can be used directly and related calculations are not necessary.

As an optional implementation, the reference transmission link is a transmission link between the terminal and a second satellite; or The reference transmission link is a transmission link between the terminal and the ground base station.

Wherein, the second satellite may be any satellite other than the first satellite, In addition, the reference transmission link is the transmission link between the terminal and the second satellite, which can be applied to a scenario where a plurality of satellites serve the terminal, or a scenario where a plurality of satellites and a base station serve the terminal; the reference transmission link is the transmission link between the terminal and the ground base station, which is applied to a scenario where a plurality of satellites and base stations serve the terminal, or can also be applied to a scenario where a single satellite and a single base station serve the terminal, or can also be applied the scenario where a plurality of satellites and a plurality of base stations serve the terminal.

As an optional implementation, the obtaining, by the network side device, the reference compensation parameter of the reference transmission link includes:

Receiving, by the network side device, the reference compensation parameter of the reference transmission link sent by other network side devices; or Calculating, by the network side device, the reference compensation parameter of the reference transmission link according to ephemeris information of the satellite of the reference transmission link.

Wherein, the receiving, by the network side device, the reference compensation parameter of the reference transmission link sent by other network side devices may be transmitting the reference compensation parameter of the reference transmission link between network side devices (for example: between satellite base stations, between gateways, between the satellite base stations and the gateway, between the satellite base station or the gateway and the ground base station). Further, the reference compensation parameter may include at least one of reference point information of the reference transmission link, compensated delay or timing advance (TA) information, Doppler frequency shift compensation information, and the like.

The ephemeris information of the satellite of the reference transmission link may be exchanging ephemeris information between network side devices (for example: between satellite base stations, between gateways, between the satellite base station and the gateway, between the satellite base station or the gateway and ground base station), and may also to exchange satellite angle information and other information. Therefore, the compensation parameter of the reference link can be derived from the ephemeris information of the satellite of the reference transmission link.

Further, the network side can also send the timing or frequency compensation information used by the reference transmission link to other satellites or ground gateways as reference information for timing compensation or frequency compensation.

As an optional implementation, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

Wherein, the common timing compensation parameter of the cell or satellite beam corresponding to the reference transmission link may be the common timing compensation parameter of the cell or the satellite beam corresponding to the network side device of the reference transmission link. And in the timing compensation of the reference transmission link, the network side can compensate the common timing offset of the cell or the satellite beam, or the network side does not compensate, and all timing compensation is performed by the terminal. The setting of common timing compensation parameter is realized by setting a common timing reference point for one cell or one satellite beam.

The common frequency compensation parameter of the cell or the satellite beam corresponding to the reference transmission link may be the common frequency compensation parameter of the cell or the satellite beam corresponding to the network side device of the reference transmission link. And in the frequency compensation of the reference transmission link, the network side can compensate the common frequency offset of the cell or the satellite beam, or the network side does not compensate, and all frequency compensation is performed by the terminal. The setting of common frequency compensation parameter is realized by setting a common frequency compensation reference point for one cell or one satellite beam.

In this embodiment, since the reference compensation parameter may include a common timing compensation parameter and a common frequency compensation parameter, the complexity of the reference transmission link compensation can be reduced.

The terminal-specific timing compensation parameter corresponding to the reference transmission link may be the terminal-specific timing compensation parameter corresponding to the network side device of the reference transmission link, and the timing compensation parameter of the terminal corresponding to the reference transmission link may be the timing compensation parameter of the terminal corresponding to the network side device of the reference transmission link, which can improve the accuracy of the reference compensation parameter.

As an optional implementation, all or part of the compensation of the transmission signal of the first transmission link or the reference transmission link is performed by the network side;

The all compensation includes all sending compensation or all receiving compensation;

The part of compensation includes the part of sending compensation or the part of receiving compensation.

Wherein, for the downlink signal, all sending compensation may be performed on the network side device, for example: the sending compensation for the downlink signal performed by the network side device is the full compensation of the downlink signal; and a part of sending compensation for the downlink signal is performed on the network side device, and another part of sending compensation is performed on the terminal side, for example, the sending compensation for the downlink signal performed by the network side device is a part of compensation of the downlink signal, and the sending compensation for the downlink signal performed by the terminal is another part of compensation of the downlink signal. Similarly, the network side can also perform full or part of receiving compensation for the uplink signal. In addition, the part of compensation can also be called relative compensation.

Further, all the compensation of the first transmission link may include reference compensation and additional compensation, wherein the reference compensation is sending or receiving compensation corresponding to the reference compensation parameter, and the additional compensation is additional sending or receiving compensation performed on the basis of the reference compensation.

Optionally, the part of compensation of the first transmission link or the reference transmission link includes timing or frequency compensation between the reference point and the ground gateway or satellite in the transmission link.

A reference point may be set for each transmission link, and the reference points of different transmission links may be the same or different.

Of course, this is not limited. For example, the part of sending compensation may also be a part of sending compensation in the timing sending compensation and the frequency sending compensation, and the part of receiving compensation may also be a part of receiving compensation in timing receiving compensation and frequency receiving compensation.

In this embodiment, since all or part of the compensation can be performed, the flexibility of the compensation of the transmission signal can be improved to meet the requirements of different devices.

As an optional implementation, performing, by the network side device, the sending compensation on the transmission signal of the first transmission link according to the first compensation parameter includes:

Performing, by the network side device, reference compensation and additional compensation on the downlink transmission signal of the first transmission link according to the first compensation parameter;

The reference compensation is a sending compensation corresponding to the reference compensation parameter, and the additional compensation is an additional sending compensation performed on the basis of the reference compensation.

In this embodiment, it can be implemented that the first transmission link performs compensation with reference to the reference compensation of the reference transmission link, so as to achieve synchronization of signals transmitted by each transmission link. Specifically, when the network side performs downlink data transmission, other transmission links additionally perform timing and frequency compensation relative to the reference transmission link on the basis of the compensation of the reference transmission link. And as a special implementation, the deviation between the other transmission links and the reference transmission link is allowed to differ by an integer number of slots.

For example, during downlink cooperative transmission, a plurality of cooperative transmission points obtain timing and frequency compensation information of the reference transmission link, and the compensation of the cooperative transmission points of other transmission links performs additional compensation after the reference compensation. The purpose of such compensation is to make downlink transmitted signals arrive at the terminal with the same time and frequency offset, the terminal does not need to perform separate compensation for each downlink, and can support the application of the MIMO technology.

Of course, for the downlink transmission signal, the network side device can also only compensate for part of the time and frequency values, and the terminal compensates the remaining time or frequency offset. For example, the reference compensation and a part of sending compensation of the additional compensation are performed. That is to say, in the embodiment of the present disclosure, the network side may perform the reference compensation and all or part of the sending compensation in the additional compensation for the downlink transmission signal.

As an optional embodiment, the method further includes at least one of the following:

sending, by the network side device, indication information of the reference transmission link to the terminal;

sending, by the network side device, a receiving compensation mode notification of the downlink signal to the terminal;

sending, by the network side device, a sending compensation mode notification of the uplink signal to the terminal;

In this embodiment, the network side can use a wireless transmission link between one of the transmission points and the terminal as a reference link, and notify the terminal, so that the terminal and the network side use the same reference transmission link. Of course, this is not limited, for example, the reference transmission link may also be pre-configured for the terminal.

Further, in this embodiment, the network side can also send a receiving compensation mode notification of the downlink signal and the sending compensation mode notification of the uplink signal to the terminal, so that the terminal can perform corresponding compensation on the downlink signal and the uplink signal according to the compensation mode issued by the network side. Of course, the compensation mode for the downlink signal and the compensation mode for the uplink signal may also be pre-configured to the terminal or agreed in the protocol.

In the embodiment of the present disclosure, the network side device obtains the reference compensation parameter of the reference transmission link of the terminal; the network side device determines the first compensation parameter of the first transmission link according to the reference compensation parameter, and the first transmission link is a transmission link between the terminal and the first satellite; the network side device performs sending or receiving compensation on the transmission signal of the first transmission link according to the first compensation parameter. Since the sending or receiving compensation is performed on the transmission signal of the first transmission link according to the first compensation parameter, the transmission effect of the transmission signal can be improved.

Figure 4:
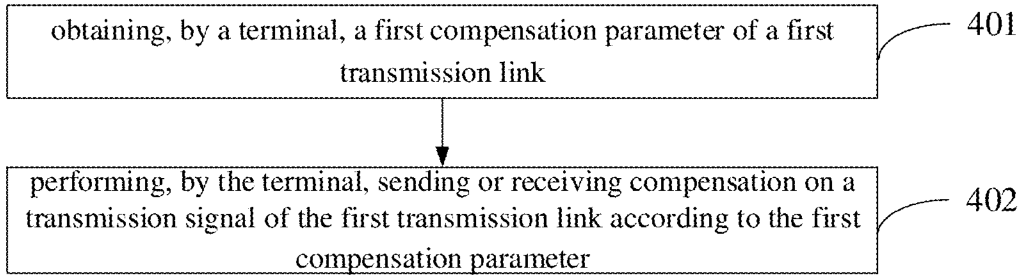
FIG. 4 is another flowchart of a transmission signal compensation method provided by an embodiment of the present disclosure.

FIG. 4 is a flowchart of another transmission signal compensation method provided by an embodiment of the present disclosure. As shown in FIG. 4, the following steps are included:

Step 401: obtaining, by a terminal, a first compensation parameter of a first transmission link, wherein the first transmission link is a transmission link between the terminal and a satellite;

Step 402: performing, by the terminal, sending or receiving compensation on a transmission signal of the first transmission link according to the first compensation parameter.

Optionally, the first compensation parameter includes at least one of the following:

A timing compensation parameter and a frequency compensation parameter.

Optionally, obtaining, by the terminal, the first compensation parameter of the first transmission link, includes:

Obtaining, by the terminal, a reference compensation parameter of a reference transmission link of the terminal, and determining the first compensation parameter of the first transmission link according to the reference compensation parameter; or Receiving, by the terminal, the first compensation parameter of the first transmission link sent by a network side device.

Optionally, determining, by the terminal, the first compensation parameter of the first transmission link according to the reference compensation parameter, includes:

Determining, by the terminal, the first compensation parameter of the first transmission link according to the reference compensation parameter and a link parameter, wherein the link parameter is used to indicate a link parameter difference between the first transmission link and the reference transmission link.

Optionally, the reference transmission link is a transmission link between the terminal and a second satellite; or The reference transmission link is a transmission link between the terminal and a ground base station.

Optionally, obtaining, by the terminal, the reference compensation parameter of the reference transmission link of the terminal, includes:

receiving, by the terminal, the reference compensation parameter of the reference transmission link sent by the network side device; or calculating, by the terminal, the reference compensation parameter of the reference transmission link according to ephemeris information of a satellite of the reference transmission link.

Optionally, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

It should be noted that, reference may be made to the corresponding description of the embodiment shown in FIG. 2, which will not be repeated here.

Optionally, all or part of the compensation of the transmission signal of the first transmission link or the reference transmission link is performed by the terminal;

The all compensation includes all sending compensation or all receiving compensation;

The part of compensation includes the part of sending compensation or the part of receiving compensation.

Wherein, all the compensation of the first transmission link may include reference compensation and additional compensation, wherein the reference compensation is sending or receiving compensation corresponding to the reference compensation parameter, and the additional compensation is additional sending or receiving compensation performed on the basis of the reference compensation.

Optionally, the part of compensation of the first transmission link or the reference transmission link includes timing or frequency compensation between the terminal and the reference point in the transmission link.

In this embodiment, the uplink timing compensation method of the reference transmission link on the terminal side can adopt a relative compensation mechanism or a full compensation mechanism. In addition, the uplink frequency compensation method of the reference transmission link on the terminal side may adopt a relative Doppler frequency shift compensation mechanism or a full Doppler frequency shift compensation mechanism.

Optionally, during uplink transmission, the compensation parameter of each transmission link is calculated based on the respective link parameter information, and the terminal performs the sending compensation on the transmission signal of the first transmission link according to the first compensation parameter, includes: performing, by the terminal, full or part of sending compensation on the uplink transmission signal of the first transmission link independently according to the first compensation parameter; or The first compensation parameter is a compensation parameter calculated based on the reference compensation parameter of the reference transmission link of the terminal, and performing, by the terminal, the sending compensation on the transmission signal of the first transmission link according to the first compensation parameter, includes: performing, by the terminal, all or part of sending compensation in the reference compensation and the additional compensation on the uplink transmission signal of the first transmission link according to the first compensation parameter, wherein the reference compensation is the sending compensation corresponding to the reference compensation parameter, the additional compensation is additional sending compensation performed on the basis of the reference compensation; or Adopting, by the terminal, a same sending side compensation when transmitting the uplink signal in each transmission link.

The terminal independently performing the sending compensation on the uplink transmission signal of the first transmission link according to the first compensation parameter may be that when the terminal sends the uplink signal to a plurality of satellites or a satellite and a ground base station, the timing and frequency pre-compensation are independently performed based on the timing and frequency offset information of each link. And in this embodiment, the independent compensation can select all compensation or a relative compensation mechanism.

The terminal performing reference compensation and additional compensation on the uplink transmission signal of the first transmission link according to the first compensation parameter may be that, the terminal may use one of the transmission links as a reference during uplink transmission, and the timing and compensation mechanism of other transmission links performs additional timing and frequency compensation on the basis of the reference link. Similarly, in this embodiment, all compensation or relative compensation mechanisms can be selected.

The terminal adopts the same sending end compensation when sending the uplink signal of each transmission link, and the remaining compensation is performed by the network side at the receiving end of the uplink signal. That is, the terminal may set the same timing compensation and the frequency offset value during uplink transmission, the remaining timing offset or frequency offset is compensated by the network.

Through the above three methods, when the terminal sends data to a plurality of satellites or the satellite and the ground base station, the timing or frequency pre-compensation can be performed with reference link alignment, so that signals arrive synchronously on the receiving side, or the sending timing and frequency compensation value are independently adjusted on each link.

Optionally, when receiving the downlink signal, the terminal receives and detects the data signal of each link based on the compensation information of the network. Further, when the terminal receives inter-satellite or satellite-ground multi-link downlink signal transmission, the terminal can use the reference transmission link to perform compensation. For example, frequency compensation is performed on the reference transmission link for each transmission link.

Optionally, the method further includes:

Receiving, by the terminal, indication information of the reference transmission link sent by the network side.

Optionally, the method also includes at least one of the following:

receiving, by the terminal, a receiving compensation mode notification of a sending downlink signal sent by the network side;

receiving, by the terminal, a sending compensation mode notification of a sending uplink signal sent by the network side.

It should be noted that, this embodiment is an implementation on the terminal side corresponding to the embodiment shown in FIG. 2, and the specific implementation can refer to the relevant description of the embodiment shown in FIG. 2. In order to avoid repeated descriptions, this embodiment will not be repeated, and the same beneficial effects can also be achieved.

The method provided by the embodiment of the present disclosure is illustrated below with two examples:

EXAMPLE 1

The downlink timing and frequency compensation method is exemplified:

Method 1: Downlink Inter-Satellite Cooperative Transmission

For inter-satellite cooperative transmission, the network side can additionally perform pre-compensation in order to keep consistent Doppler shift and time point of the plurality of transmission links reaching the terminal. When applied for low-orbit communication, the Doppler shift is proportional to the moving speed of the satellite, which is relatively large and requires Doppler frequency shift pre-compensation. In high-orbit satellite communication, the satellite does not move relative to the ground, and the Doppler shift thereof is not considered.

Figure 5:
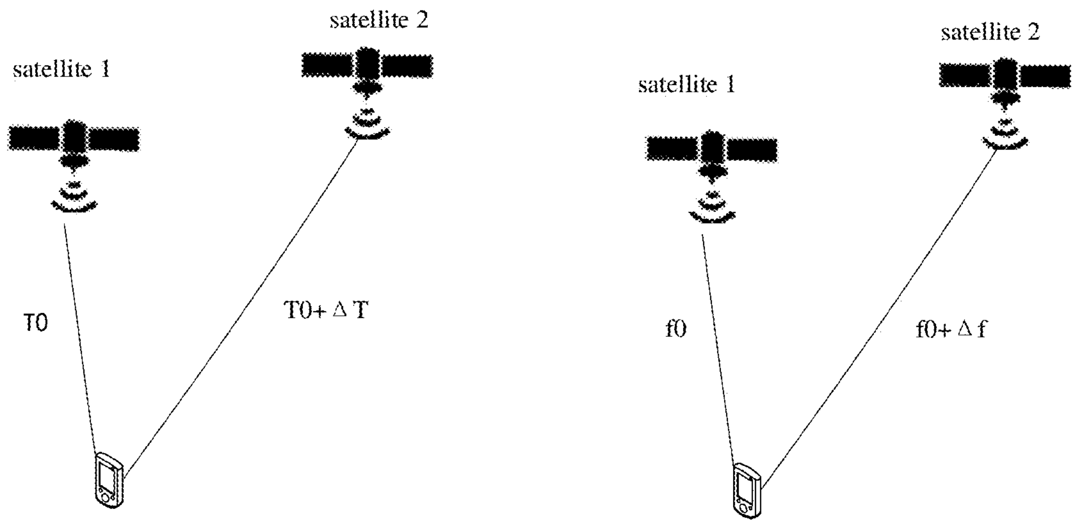
FIG. 5 is a schematic diagram of transmission compensation provided by an embodiment of the present disclosure.

As shown in FIG. 5, the transmission delays from satellite 1 and satellite 2 to the terminal are different. For a low-orbit satellite, its Doppler shift is also different. Doppler shift fd=fc*v*cos(a), v is the speed of light, fc is the carrier frequency, and a is the angle between the running direction of the satellite and the terminal.

In order to ensure that the delay and Doppler offset of the satellite signal reaching the terminal are consistent, the timing and frequency offset of the transmission link between satellite 1 and the terminal can be used as the reference, that is, if the timing compensation from satellite 1 to the terminal is TO, then the satellite 2 needs to compensate T0+ΔT (delta_T). If the Doppler compensation from satellite 1 to the terminal is f0, satellite 2 needs to compensate f0+Δf (delta_f). For the compensation method of satellite 1 to terminal link, since satellite 1 may serve a plurality of terminals, the timing and frequency compensation of the satellite can be performed based on a common timing and Doppler offset. Further, since the terminal may have the ephemeris information of the satellite, the network may not compensate the frequency offset for the reference link, and the terminal may compensate all the Doppler offset; for the timing part, the network may not compensate the transmission delay of the satellite 1, only satellite 2 compensates a relative delay part.

Method 2: Downlink Satellite-Ground Cooperative Transmission

Figure 6:
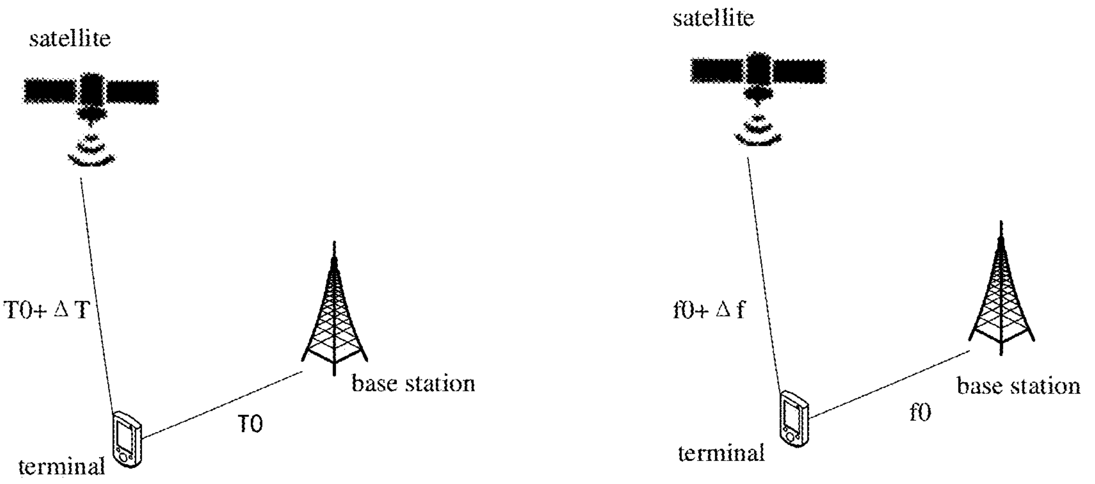
FIG. 6 is another schematic diagram of transmission compensation provided by an embodiment of the present disclosure.

As shown in FIG. 6, in the satellite-ground cooperative transmission scenario, the reference link can optionally set the connection link between the ground base station and the terminal. This is because the ground base station does not move, and the Doppler shift thereof is mainly caused by the movement of the terminal, which is much smaller than the Doppler shift caused by the movement of a low-orbit satellite. On the other hand, for the transmission delay, the distance between the base station and the satellite is much smaller than the distance between the satellite and the ground. Therefore, the transmission link between the ground base station to the terminal is suitable to be used as a reference link.

In order to ensure that the time delay and Doppler offset of the satellite signal arriving the terminal and a signal from the ground base station to the terminal are consistent, in this embodiment, the timing and frequency offset from the ground base station to the terminal are used as the reference, that is, if the timing compensation from the ground base station to the terminal is T0, satellite 1 needs to compensate T0+delta_T, if the Doppler compensation from the base station to the terminal is f0, satellite 1 needs to compensate f0+delta_f. Since the timing and frequency compensation of the ground base station is relatively simple, the usual method is not to compensate, the relative compensation of the satellite is more important, which can ensure that the signal arrives the terminal consistently, which is beneficial to the signal reception of the terminal.

EXAMPLE 2

Figure 7:
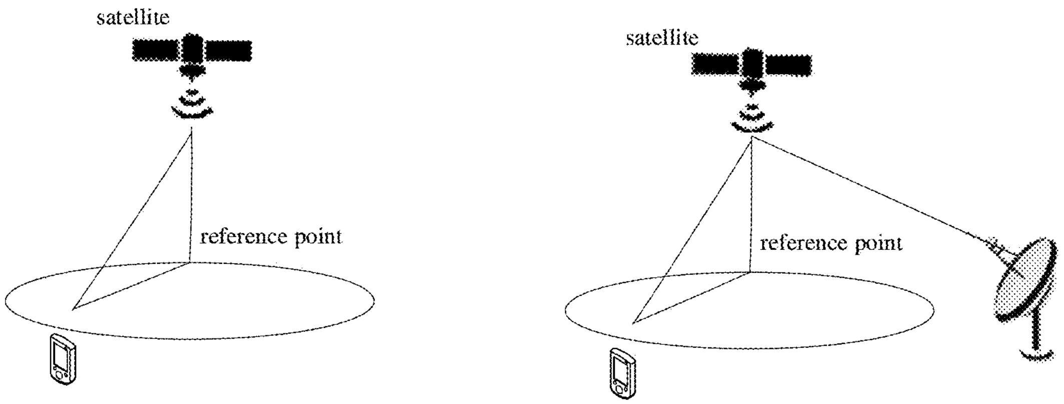
FIG. 7 is yet another schematic diagram of transmission compensation provided by an embodiment of the present disclosure.

In this embodiment, the uplink timing and frequency compensation are exemplified FIG. 7 shows a schematic diagram of setting reference points for transmission links. For example, for bent-pipe satellite communication and regeneration satellite communication, if relative compensation is used, the terminal only compensates the timing advance of the transmission delay deviation*2 of the terminal relative to the reference point, the network side compensates the timing advance of the transmission delay deviation*2 from the reference point to the ground base gateway or satellite. If it is full compensation, the terminal needs to compensate all the timing advance in the link, which is equal to 2 times of the transmission delay. Similarly, the Doppler offset compensation is also based on the reference point. When relative Doppler compensation is performed, the terminal compensates the Doppler deviation relative to the reference point. For all Doppler compensation, the terminal needs to compensate all the Doppler offsets.

Further, in the multi-satellite or satellite-ground uplink cooperative transmission, when the terminal sends uplink data to a plurality of satellites or satellites and ground base stations, there are three main compensation methods as follows:

Method 1: Independently performing timing and frequency pre-compensation based on timing and frequency offset information for each link. The compensation method can select the full compensation or relative compensation mechanism.

The independent compensation means that when the terminal performs timing or frequency deviation compensation, each link independently calculates and compensates independently, and does not subtract from each other. For example, when all compensation mechanisms are used, the terminal calculates the transmission delay and Doppler shift in the uplink, and performs fully reverse compensation to ensure that the signals are synchronized when reaching the receiving end. If relative compensation is used, the reference point can be set independently for each link, and the relative compensation value is different at this time.

Method 2: During uplink transmission, the terminal uses one of the transmission links as a reference, and the timing and compensation mechanisms of other transmission links perform additional timing and frequency compensation on the basis of the reference transmission link.

For method 2, it means that when the terminal sends a signal, the reference transmission link is compensated first, and the signals of other transmission links are compensated for the reference value and then additional compensation is performed, which can simplify the operation on the network side. No matter multiple-satellites or satellite-to-ground, the timing and frequency compensation values are the same after receiving the uplink signal.

Method 3: During uplink transmission, the terminal sets the same timing compensation and frequency compensation values, and the remaining timing offset or frequency offset is compensated by the network.

For method 3, the implementation of the terminal is very simple. For different transmission links, the terminal no longer adapts each link, but adopts unified timing advance compensation and frequency compensation, and the remaining timing and frequency deviation are compensated by the network side.

Figure 8:
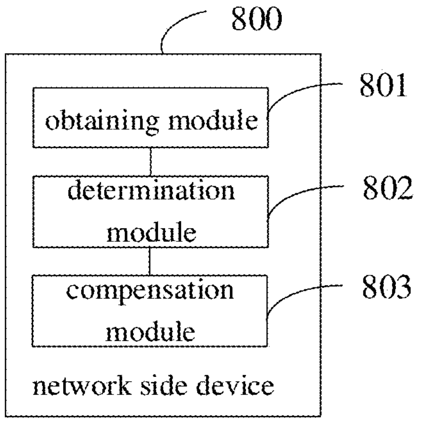
FIG. 8 is a structural diagram of a network side device provided by an embodiment of the present disclosure.

FIG. 8 is a structural diagram of a network side device provided by an embodiment of the present disclosure. As shown in FIG. 8, the network side device 800 includes:

an obtaining module 801, configured to obtain a reference compensation parameter of a reference transmission link of a terminal;

a determination module 802, configured to determine a first compensation parameter of a first transmission link according to the reference compensation parameter, wherein the first transmission link is a transmission link between the terminal and a first satellite;

a compensation module 803, configured to perform sending or receiving compensation for a transmission signal of the first transmission link according to the first compensation parameter.

Optionally, the determining module 802 is configured to determine the first compensation parameter of the first transmission link according to the reference compensation parameter and a link parameter, wherein the link parameter is used to indicate a link parameter difference between the first transmission link and the reference transmission link.

Optionally, the reference compensation parameter or the first compensation parameter includes at least one of the following:

A timing compensation parameter; or

A frequency compensation parameter.

Figure 9:
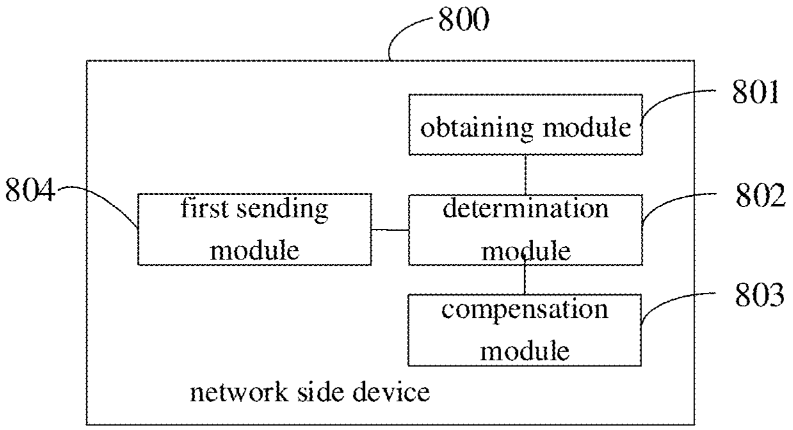
FIG. 9 is another structural diagram of a network side device provided by an embodiment of the present disclosure.

Optionally, as shown in FIG. 9, the network side device 800 further includes:

a first sending module 804, configured to send the first compensation parameter to the terminal.

Optionally, the reference transmission link is a transmission link between the terminal and a second satellite; or The reference transmission link is a transmission link between the terminal and the ground base station.

Optionally, the obtaining module 801 is configured to receive the reference compensation parameter of the reference transmission link sent by other network side devices; or The obtaining module 801 is configured to calculate the reference compensation parameter of the reference transmission link according to ephemeris information of the satellite of the reference transmission link.

Optionally, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

Optionally, all or part of the compensation of the transmission signal of the first transmission link or the reference transmission link is performed by the network side;

The all compensation includes all sending compensation or all receiving compensation;

The part of compensation includes the part of sending compensation or the part of receiving compensation.

Optionally, the part of compensation of the first transmission link or the reference transmission link includes timing or frequency compensation between the reference point and the ground gateway or satellite in the transmission link.

Optionally, the compensation module 803 is configured to perform reference compensation and additional compensation on the downlink transmission signal of the first transmission link according to the first compensation parameter;

The reference compensation is a sending compensation corresponding to the reference compensation parameter, and the additional compensation is an additional sending compensation performed on the basis of the reference compensation.

Figure 10:
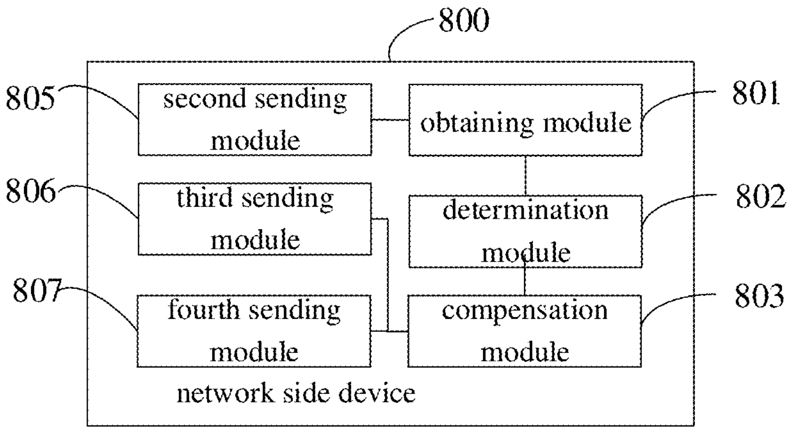
FIG. 10 is yet another structural diagram of a network side device provided by an embodiment of the present disclosure.

Optionally, as shown in FIG. 10, the network side device further includes at least one of the following:

a second sending module 805, configured to send indication information of the reference transmission link to the terminal;

a third sending module 806, configured to send a receiving compensation mode notification of the downlink signal to the terminal;

a fourth sending module 807, configured to send a sending compensation mode notification of the uplink signal to the terminal.

It should be noted that the network side device 800 in this embodiment may be a network side device in any implementation of the method embodiments in the embodiments of the present disclosure, and any implementation of the network side device in the method embodiments of the present disclosure, which can be implemented by the network side device 800, and achieve the same beneficial effect, which is not repeated here.

Figure 11:
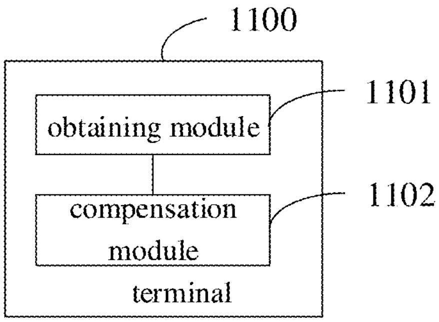
FIG. 11 is a structural diagram of a terminal provided by an embodiment of the present disclosure.

FIG. 11 is a structural diagram of a terminal provided by an embodiment of the present disclosure. As shown in FIG. 11, the terminal 1100 includes:

an obtaining module 1101, configured to obtain a first compensation parameter of a first transmission link, wherein the first transmission link is a transmission link between the terminal and a satellite;

a compensation module 1102, configured to perform sending or receiving compensation on a transmission signal of the first transmission link according to the first compensation parameter.

Optionally, the first compensation parameter includes at least one of the following:

A timing compensation parameter and a frequency compensation parameter.

Optionally, the obtaining module 1101 is configured to obtain a reference compensation parameter of a reference transmission link of the terminal, and determining the first compensation parameter of the first transmission link according to the reference compensation parameter; or The obtaining module 1101 is configured to receive the first compensation parameter of the first transmission link sent by a network side device.

Optionally, the obtaining module 1101 is configured to determine the first compensation parameter of the first transmission link according to the reference compensation parameter and a link parameter, wherein the link parameter is used to indicate a link parameter difference between the first transmission link and the reference transmission link.

Optionally, the reference transmission link is a transmission link between the terminal and a second satellite; or The reference transmission link is a transmission link between the terminal and a ground base station.

Optionally, the obtaining, by the terminal, the reference compensation parameter of the reference transmission link of the terminal, includes:

receiving, by the terminal, the reference compensation parameter of the reference transmission link sent by the network side device; or calculating, by the terminal, the reference compensation parameter of the reference transmission link according to ephemeris information of a satellite of the reference transmission link.

Optionally, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

Optionally, all or part of the compensation of the transmission signal of the first transmission link or the reference transmission link is performed by the terminal;

The all compensation includes all sending compensation or all receiving compensation;

The part of compensation includes the part of sending compensation or the part of receiving compensation.

Optionally, the part of compensation of the first transmission link or the reference transmission link includes timing or frequency compensation between the terminal and the reference point in the transmission link.

Optionally, during uplink transmission, the compensation parameter of each transmission link is calculated based on the respective link parameter information, and the compensation module 1102 performs full or part of sending compensation on the uplink transmission signal of the first transmission link independently according to the first compensation parameter; or The first compensation parameter is a compensation parameter calculated based on the reference compensation parameter of the reference transmission link of the terminal, and the compensation module 1102 performs all or part of sending compensation in the reference compensation and the additional compensation on the uplink transmission signal of the first transmission link according to the first compensation parameter, wherein the reference compensation is the sending compensation corresponding to the reference compensation parameter, the additional compensation is additional sending compensation performed on the basis of the reference compensation; or Adopting, by the terminal, a same sending side compensation when transmitting the uplink signal in each transmission link.

Figure 12:
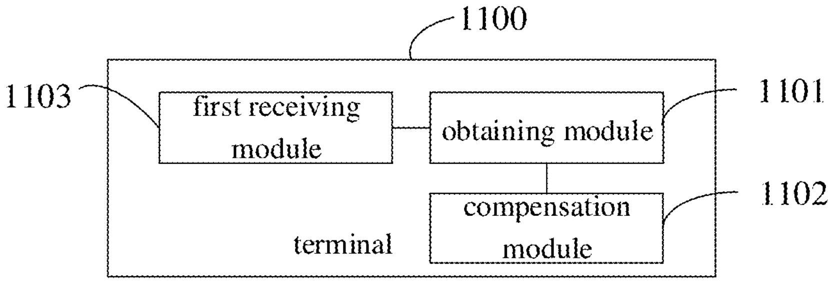
FIG. 12 is another structural diagram of a terminal provided by an embodiment of the present disclosure.

Optionally, as shown in FIG. 12, the terminal 1100 further includes:

a first receiving module 1103, configured to receive indication information of the reference transmission link sent by the network side.

Figure 13:
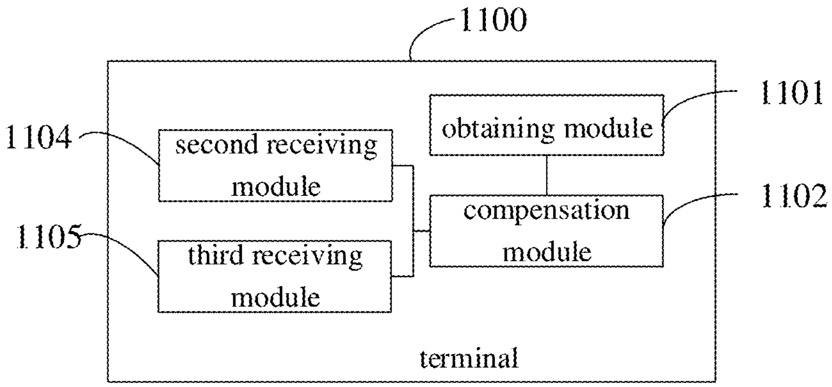
FIG. 13 is yet another structural diagram of a terminal provided by an embodiment of the present disclosure.

Optionally, as shown in FIG. 13, the terminal 1100 further includes:

a second receiving module 1104, configured to receive a receiving compensation mode notification of a sending downlink signal sent by the network side;

a third receiving module 1105, configured to receive a sending compensation mode notification of a sending uplink signal sent by the network side.

It should be noted that the terminal 1100 in this embodiment may be a terminal of any implementation in the method embodiment of the present disclosure, and any implementation of the terminal in the method embodiment of the present disclosure may be implemented by the terminal 1100 in this embodiment. The same beneficial effects is achieved, which will not be repeated here.

Figure 14:
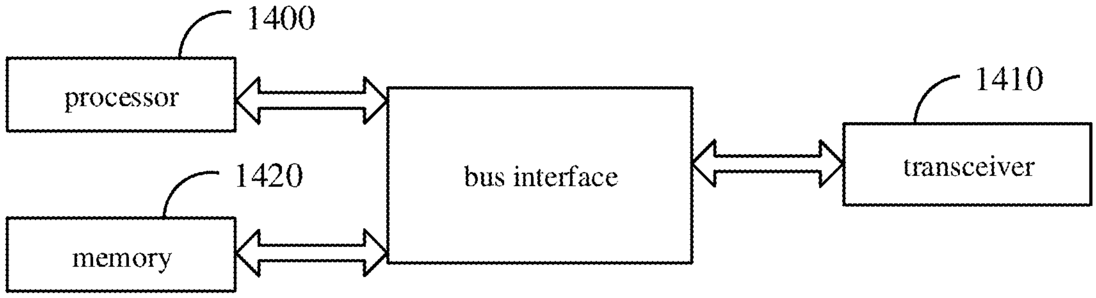
FIG. 14 is still yet another structural diagram of a terminal provided by an embodiment of the present disclosure.

FIG. 14 is a structural diagram of another network side device provided by an embodiment of the present disclosure. As shown in FIG. 14, the network side device includes: a transceiver 1410, a memory 1420, a processor 1400, and a program stored in the memory 1420 and executed by the processor 1400, wherein:

The transceiver 1410 or the processor 1400 is configured to obtain a reference compensation parameter of a reference transmission link of a terminal;

The processor 1400 is configured to determine a first compensation parameter of a first transmission link according to the reference compensation parameter, wherein the first transmission link is a transmission link between the terminal and a first satellite;

The transceiver 1410 or the processor 1400 is configured to perform sending or receiving compensation for a transmission signal of the first transmission link according to the first compensation parameter.

The transceiver 1410 may be used to receive and transmit data under the control of the processor 1400.

In FIG. 14, the bus architecture may include any number of interconnected buses and bridges, in particular various circuits of one or more processors represented by processor 1400 and memory represented by memory 1420 linked together. The bus architecture may also link together various other circuits, such as peripherals, voltage regulators, and power management circuits, which are well known in the art and, therefore, will not be described further herein. The bus interface provides the interface. Transceiver 1410 may be a number of elements, including a transmitter and a receiver that provide a means for communicating with various other devices over a transmission medium.

The processor 1400 is responsible for managing the bus architecture and general processing, and the memory 1420 may store data used by the processor 1400 in performing operations.

It should be noted that the memory 1420 is not limited to only on the network side device, and the memory 1420 and the processor 1400 may be separated and located in different geographical locations.

Optionally, the determining the first compensation parameter of the first transmission link according to the reference compensation parameter includes:

determining the first compensation parameter of the first transmission link according to the reference compensation parameter and a link parameter, wherein the link parameter is used to indicate a link parameter difference between the first transmission link and the reference transmission link.

Optionally, the reference compensation parameter or the first compensation parameter includes at least one of the following:

A timing compensation parameter; or

A frequency compensation parameter.

Optionally, the transceiver 1410 is further configured to send the first compensation parameter to the terminal.

Optionally, the reference transmission link is a transmission link between the terminal and a second satellite; or The reference transmission link is a transmission link between the terminal and the ground base station.

Optionally, the obtaining reference compensation parameter of the reference transmission link includes:

receiving the reference compensation parameter of the reference transmission link sent by other network side devices; or calculating the reference compensation parameter of the reference transmission link according to ephemeris information of the satellite of the reference transmission link.

Optionally, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

Optionally, all or part of the compensation of the transmission signal of the first transmission link or the reference transmission link is performed by the network side;

The all compensation includes all sending compensation or all receiving compensation;

The part of compensation includes the part of sending compensation or the part of receiving compensation.

Optionally, the part of compensation of the first transmission link or the reference transmission link includes timing or frequency compensation between the reference point and the ground gateway or satellite in the transmission link.

Optionally, the performing sending compensation for the transmission signal of the first transmission link according to the first compensation parameter includes:

performing reference compensation and additional compensation on the downlink transmission signal of the first transmission link according to the first compensation parameter;

The reference compensation is a sending compensation corresponding to the reference compensation parameter, and the additional compensation is an additional sending compensation performed on the basis of the reference compensation.

Optionally, the transceiver 1410 is further configured to perform at least one of the following:

sending indication information of the reference transmission link to the terminal;

sending a receiving compensation mode notification of the downlink signal to the terminal;

sending a sending compensation mode notification of the uplink signal to the terminal.

It should be noted that the above network side device in this embodiment may be a network side device in any implementation in the method embodiment of the present disclosure, and any implementation in the network side device in the method embodiment of the present disclosure may be implemented by the network side device in this embodiment, and achieves the same beneficial effects, which will not be repeated here.

Figure 15:
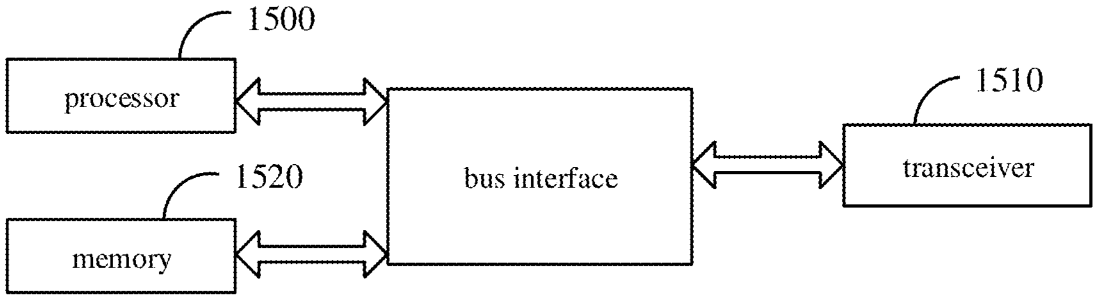
FIG. 15 is another structural diagram of a network side device provided by an embodiment of the present disclosure.

FIG. 15 is a structural diagram of another terminal provided by an embodiment of the present disclosure. As shown in FIG. 15, the terminal includes: a transceiver 1510, a memory 1520, a processor 1500, and a program stored on the memory 1520 and executed by the processor 1500, wherein:

The transceiver 1510 or the processor 1500 is configured to obtain a first compensation parameter of a first transmission link, wherein the first transmission link is a transmission link between the terminal and a satellite;

The transceiver 1510 or the processor 1500 is configured to perform sending or receiving compensation on a transmission signal of the first transmission link according to the first compensation parameter.

The transceiver 1510 may be used to receive and transmit data under the control of the processor 1500.

In FIG. 15, the bus architecture may include any number of interconnected buses and bridges, in particular various circuits of one or more processors represented by processor 1500 and memory represented by memory 1520 linked together. The bus architecture may also link together various other circuits, such as peripherals, voltage regulators, and power management circuits, which are well known in the art and, therefore, will not be described further herein. The bus interface provides the interface. Transceiver 1510 may be a number of elements, including a transmitter and a receiver that provide a means for communicating with various other devices over a transmission medium.

The processor 1500 is responsible for managing the bus architecture and general processing, and the memory 1520 may store data used by the processor 1500 in performing operations.

It should be noted that, the memory 1520 is not limited to only on the terminal, and the memory 1520 and the processor 1500 may be separated and located in different geographical locations.

Optionally, the first compensation parameter includes at least one of the following:

A timing compensation parameter and a frequency compensation parameter.

Optionally, the obtaining the first compensation parameter of the first transmission link includes:

Obtaining, by the terminal, a reference compensation parameter of a reference transmission link of the terminal, and determining the first compensation parameter of the first transmission link according to the reference compensation parameter; or Receiving, by the terminal, the first compensation parameter of the first transmission link sent by a network side device.

Optionally, the determining the first compensation parameter of the first transmission link according to the reference compensation parameter includes:

determining the first compensation parameter of the first transmission link according to the reference compensation parameter and a link parameter, wherein the link parameter is used to indicate a link parameter difference between the first transmission link and the reference transmission link.

Optionally, the reference transmission link is a transmission link between the terminal and a second satellite; or The reference transmission link is a transmission link between the terminal and a ground base station.

Optionally, the obtaining the reference compensation parameter of the reference transmission link of the terminal includes:

receiving the reference compensation parameter of the reference transmission link sent by the network side device; or calculating the reference compensation parameter of the reference transmission link according to ephemeris information of a satellite of the reference transmission link.

Optionally, the reference compensation parameter of the reference transmission link includes at least one of the following:

A common timing compensation parameter of a cell or a satellite beam corresponding to the reference transmission link;

A common frequency compensation parameter of the cell or the satellite beam corresponding to the reference transmission link;

A terminal-specific timing compensation parameter corresponding to the reference transmission link;

A terminal-specific frequency compensation parameter corresponding to the reference transmission link.

Optionally, all or part of the compensation of the transmission signal of the first transmission link or the reference transmission link is performed by the terminal;

The all compensation includes all sending compensation or all receiving compensation;

The part of compensation includes the part of sending compensation or the part of receiving compensation.

Optionally, the part of compensation of the first transmission link or the reference transmission link includes timing or frequency compensation between the terminal and the reference point in the transmission link.

Optionally, during uplink transmission, calculating the compensation parameter of each transmission link based on the respective link parameter information, and performing the sending compensation on the transmission signal of the first transmission link according to the first compensation parameter includes: independently performing all or part of sending compensation on the uplink transmission signal of the first transmission link according to the first compensation parameter; or The first compensation parameter is a compensation parameter calculated based on a reference compensation parameter of a reference transmission link of the terminal, and the performing sending compensation on the transmission signal of the first transmission link according to the first compensation parameter includes: performing all or part of sending compensation in the reference compensation and the additional compensation on the uplink transmission signal of the first transmission link according to the first compensation parameter, wherein the reference compensation is the sending compensation corresponding to the reference compensation parameter, the additional compensation is additional sending compensation performed on the basis of the reference compensation; or Adopting, by the terminal, a same sending side compensation when transmitting the uplink signal in each transmission link.

Optionally, transceiver 1510 is also used to:

receive indication information of the reference transmission link sent by the network side.

Optionally, the transceiver 1510 is also used for at least one of the following:

receiving a receiving compensation mode notification of a sending downlink signal sent by the network side;

receiving a sending compensation mode notification of a sending uplink signal sent by the network side.

It should be noted that the terminal in this embodiment may be a terminal of any implementation in the method embodiment of the present disclosure, and any implementation of the terminal in the method embodiment of the present disclosure may be achieved by the terminal in this embodiment and achieves the same beneficial effects, will not be repeated here.

Embodiments of the present disclosure further provide a computer-readable storage medium on which a computer program is stored, wherein, when the program is executed by a processor, the steps of the transmission signal compensation method in the terminal side provided by the embodiments of the present disclosure are implemented, or, when the program is executed by the processor, the steps of the transmission signal compensation method in the network side provided by the embodiments of the present disclosure are implemented.

In the several embodiments provided in the present disclosure, it should be understood that the disclosed method and device may be implemented in other manners. For example, the device embodiments described above are only illustrative. For example, the division of the units is only a logical function division. In actual implementation, there may be other division methods. For example, a plurality of units or components may be combined or integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

In addition, each functional unit in each embodiment of the present disclosure may be integrated into one processing unit, or each unit may be physically included individually, or two or more units may be integrated into one unit. The integrated unit may be implemented in the form of hardware, or may be implemented in the form of hardware plus software functional units.

The integrated units implemented in the form of software functional units can be stored in a computer-readable storage medium. The software functional unit is stored in a storage medium, and includes several instructions to cause a computer device (which may be a personal computer, a server, or a network device, etc.) to execute part of the method for processing information data blocks described in various embodiments of the present disclosure. The aforementioned storage medium includes: U disk, mobile hard disk, Read-Only Memory (ROM), Random Access Memory (RAM), magnetic disk or CD, etc. that can store program codes medium.

It should be noted that it should be understood that the division of each module of the above device is only a division of logical functions, and may be fully or partially integrated into a physical entity in actual implementation, or may be physically separated. And these modules can all be implemented in the form of software calling through processing elements; they can also all be implemented in hardware; some modules can also be implemented in the form of calling software through processing elements, and some modules can be implemented in hardware. For example, the determining module may be a separately established processing element, or may be integrated into a certain chip of the device to be implemented, in addition, it may also be stored in the memory of the device in the form of program code, and a certain processing element of the device may call and execute the function of the determining module. The implementation of other modules is similar. In addition, all or part of these modules can be integrated together, and can also be implemented independently. The processing element described here may be an integrated circuit with signal processing capability. In the implementation process, each step of the method or each of the modules can be completed by an integrated logic circuit of hardware in the processor element or an instruction in the form of software.

For example, each module, unit, sub-unit or sub-module may be one or more integrated circuits configured to implement the above method, such as: one or more Application Specific Integrated Circuits (ASIC), or, one or more microprocessors (digital signal processors, DSP), or, one or more field programmable gate arrays (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The above are optional embodiments of the present disclosure. It should be pointed out that for those skilled in the art, several improvements and modifications can be made without departing from the principles of the present disclosure, and these improvements and modifications should also be regarded as the protection scope of the present disclosure.

What is claimed is:

1. A transmission signal compensation method, comprising:

obtaining, by a terminal, a first compensation parameter of a first transmission link, wherein the first transmission link is a transmission link between the terminal and a first satellite, the first compensation parameter of the first transmission link is determined according to a reference compensation parameter of a reference transmission link of the terminal, and the reference compensation parameter is a compensation parameter used to compensate for at least one of transmission delay and frequency offset of a transmission signal of the terminal in the reference transmission link, the compensation parameter comprises timing advance and a Doppler frequency shift compensation value, the timing advance is configured to compensate for the transmission delay and the Doppler frequency shift compensation value is configured to compensate for the frequency offset, the reference transmission link is a transmission link between the terminal and a second satellite or the reference transmission link is a transmission link between the terminal and a ground base station;

performing, by the terminal, sending or receiving compensation on a transmission signal of the first transmission link according to the first compensation parameter.

2. The method according to claim 1, wherein the first compensation parameter comprises at least one of the following:

a timing compensation parameter and a frequency compensation parameter.

3. The method according to claim 1, wherein the obtaining, by the terminal, the first compensation parameter of the first transmission link includes:

obtaining, by the terminal, the reference compensation parameter of the reference transmission link of the terminal, and determining the first compensation parameter of the first transmission link according to the reference compensation parameter; or receiving, by the terminal, the first compensation parameter of the first transmission link sent by a network side device.

4. The method according to claim 3, wherein the determining, by the terminal, the first compensation parameter of the first transmission link according to the reference compensation parameter includes:

determining, by the terminal, the first compensation parameter of the first transmission link according to the reference compensation parameter and a link parameter, wherein the link parameter is used to indicate a link parameter difference between the first transmission link and the reference transmission link.

5. The method according to claim 3, wherein the obtaining, by the terminal, the reference compensation parameter of the reference transmission link of the terminal includes:

receiving, by the terminal, the reference compensation parameter of the reference transmission link sent by the network side device; or calculating, by the terminal, the reference compensation parameter of the reference transmission link according to ephemeris information of a satellite of the reference transmission link;

or wherein the reference compensation parameter of the reference transmission link includes at least one of the following:

a common timing compensation parameter of a cell or a satellite beam corresponding to the reference transmission link;

a common frequency compensation parameter of the cell or the satellite beam corresponding to the reference transmission link;

a terminal-specific timing compensation parameter corresponding to the reference transmission link;

a terminal-specific frequency compensation parameter corresponding to the reference transmission link.

6. The method according to claim 3, wherein all or part of compensation of the transmission signal of the first transmission link or the reference transmission link is performed by the terminal;

the all compensation includes all sending compensation or all receiving compensation;

the part of compensation includes the part of sending compensation or the part of receiving compensation, wherein the part of compensation of the first transmission link or the reference transmission link includes timing or frequency compensation between the terminal and a reference point in the transmission link.

7. The method according to claim 3, further comprising:

receiving, by the terminal, indication information of the reference transmission link sent by the network side device.

8. The method according to claim 1, wherein, during uplink transmission, a compensation parameter of each transmission link is calculated based on respective link parameter information, and performing, by the terminal, the sending compensation on the transmission signal of the first transmission link according to the first compensation parameter, includes: performing, by the terminal, full or part of sending compensation on the uplink transmission signal of the first transmission link independently according to the first compensation parameter; or the first compensation parameter is a compensation parameter calculated based on the reference compensation parameter of the reference transmission link of the terminal, and performing, by the terminal, the sending compensation on the transmission signal of the first transmission link according to the first compensation parameter, includes: performing, by the terminal, all or part of sending compensation in the reference compensation and the additional compensation on the uplink transmission signal of the first transmission link according to the first compensation parameter, wherein the reference compensation is sending compensation corresponding to the reference compensation parameter, the additional compensation is additional sending compensation performed on the basis of the reference compensation; or adopting, by the terminal, a same sending side compensation when transmitting an uplink signal in each transmission link;

or the method further comprises at least one of the following:

receiving, by the terminal, a receiving compensation mode notification of a sending downlink signal sent by the network side device;

receiving, by the terminal, a sending compensation mode notification of a sending uplink signal sent by the network side device.

9. A terminal comprising: a transceiver, a memory, a processor, and a program stored on the memory and executed by the processor, wherein, the transceiver or the processor is configured to obtain a first compensation parameter of a first transmission link, wherein the first transmission link is a transmission link between the terminal and a first satellite, the first compensation parameter of the first transmission link is determined according to a reference compensation parameter of a reference transmission link of the terminal, and the reference compensation parameter is a compensation parameter used to compensate for at least one of transmission delay and frequency offset of a transmission signal of the terminal in the reference transmission link, the compensation parameter comprises timing advance and a Doppler frequency shift compensation value, the timing advance is configured to compensate for the transmission delay and the Doppler frequency shift compensation value is configured to compensate for the frequency offset, the reference transmission link is a transmission link between the terminal and a second satellite or the reference transmission link is a transmission link between the terminal and a ground base station;

the transceiver or the processor is configured to perform sending or receiving compensation on a transmission signal of the first transmission link according to the first compensation parameter.

* * * * *